(12) United States Patent
Izuma (10) Patent No.: US 10,442,389 B2
(45) Date of Patent: Oct. 15, 2019

(54) GAS GENERATOR

(71) Applicant: DAICEL CORPORATION, Osaka-shi, Osaka (JP)

(72) Inventor: Toshihiro Izuma, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 16/067,251

(22) PCT Filed: Jan. 13, 2017

(86) PCT No.: PCT/JP2017/001001
§ 371 (c)(1),
(2) Date: Jun. 29, 2018

(87) PCT Pub. No.: WO2017/130735
PCT Pub. Date: Aug. 3, 2017

(65) Prior Publication Data
US 2019/0023219 A1    Jan. 24, 2019

(30) Foreign Application Priority Data

Jan. 26, 2016   (JP) ................................. 2016-012366

(51) Int. Cl.
*B60R 21/264*       (2006.01)
*B60R 21/26*        (2011.01)

(52) U.S. Cl.
CPC ... *B60R 21/264* (2013.01); *B60R 2021/26011* (2013.01); *B60R 2021/26029* (2013.01); *B60R 2021/26076* (2013.01)

(58) Field of Classification Search
CPC ......... B60R 21/264; B60R 2021/26011; B60R 2021/26029; B60R 2021/26076

(Continued)

(56) References Cited

U.S. PATENT DOCUMENTS

| | | | | |
|---|---|---|---|---|
| 5,779,268 A | * | 7/1998 | Smith | ...................... B21K 1/28 |
| | | | | 102/531 |
| 6,032,979 A | * | 3/2000 | Mossi | ................. B60R 21/2644 |
| | | | | 280/736 |

(Continued)

FOREIGN PATENT DOCUMENTS

| | | |
|---|---|---|
| JP | 2002-370607 A | 12/2002 |
| JP | 2010-143270 A | 7/2010 |

(Continued)

OTHER PUBLICATIONS

English translation of the Written Opinion of the International Searching Authority issued in the corresponding International Application No. PCT/JP2017/001001 dated Feb. 21, 2017.

(Continued)

*Primary Examiner* — Joshua E Freeman
(74) *Attorney, Agent, or Firm* — Birch, Stewart, Kolasch & Birch, LLP (57) ABSTRACT

The present invention provides a gas generator including
a housing having a circumferential wall provided with gas discharge ports,
a cylindrical filter being disposed inside the housing
an ignition device chamber being formed inside a cup-shaped ignition device chamber housing fitted to the cylindrical wall of the bottom plate of the housing, and accommodating an ignition device,
a combustion chamber being located between the cylindrical filter and the ignition device chamber housing and being charged with a gas generating agent,
the ignition device chamber housing having a flange at an opening thereof and being fitted to the cylindrical wall such that the flange is abutted against the bottom plate,
an annular retainer being disposed between the cylindrical filter and the ignition device chamber housing and having an (Continued)

annular base portion and an annular wall extending from an outer circumferential edge of the annular base portion toward the top plate, and
the annular wall being abutted against an inner circumferential surface of the cylindrical filter, the annular base portion being abutted against the bottom plate of the housing, and the annular base portion and the flange of the cup-shaped ignition device chamber housing not being overlapped in a thickness direction.

10 Claims, 4 Drawing Sheets

(58) Field of Classification Search
USPC .......................................................... 102/530
See application file for complete search history.

(56) References Cited

U.S. PATENT DOCUMENTS

| | | | | |
|---|---|---|---|---|
| 6,139,055 | A * | 10/2000 | Dahl | B60R 21/2644 280/741 |
| 6,364,354 | B1 * | 4/2002 | Nakashima | B01D 46/2411 280/736 |
| 6,460,883 | B1 * | 10/2002 | Nakashima | B01D 46/24 280/736 |
| 6,474,684 | B1 * | 11/2002 | Ludwig | B60R 21/2644 280/736 |
| 6,491,321 | B1 * | 12/2002 | Nakashima | B01D 46/24 102/530 |
| 6,547,275 | B2 * | 4/2003 | Nakashima | B01D 46/24 280/736 |
| 7,150,227 | B2 * | 12/2006 | Matsuda | B60R 21/2644 102/202 |
| 7,467,588 | B2 * | 12/2008 | Matsuda | B60R 21/2644 102/530 |
| 7,578,522 | B2 * | 8/2009 | Hanano | B60R 21/2644 102/531 |
| 7,614,875 | B2 * | 11/2009 | Katsuda | B60R 21/26 280/728.1 |
| 8,011,303 | B2 * | 9/2011 | Nakayasu | B60R 21/2644 102/530 |
| 8,375,862 | B2 * | 2/2013 | Morgan | B60R 21/26 102/530 |
| 8,382,155 | B2 * | 2/2013 | Nakayasu | B60R 21/2644 102/530 |
| 8,585,085 | B2 * | 11/2013 | Kobayashi | B60R 21/2644 102/530 |
| 8,714,091 | B2 * | 5/2014 | Kobayashi | B60R 21/2644 102/530 |
| 8,777,258 | B2 * | 7/2014 | Kobayashi | B60R 21/2644 102/334 |
| 9,051,225 | B1 * | 6/2015 | Quioc | B60R 21/2644 |
| 9,199,603 | B2 * | 12/2015 | Ohsugi | B60R 21/2644 |
| 9,731,679 | B2 * | 8/2017 | Okuyama | B60R 21/2644 |
| 9,944,249 | B2 * | 4/2018 | Okuyama | B60R 21/264 |
| 2006/0082113 | A1 * | 4/2006 | Smith | B60R 21/26 280/741 |
| 2006/0254454 | A1 * | 11/2006 | Bierwirth | B60R 21/2644 102/530 |
| 2008/0022880 | A1 * | 1/2008 | Bierwirth | B60R 21/2644 102/530 |
| 2008/0257195 | A1 * | 10/2008 | Nakayasu | B60R 21/2644 102/530 |
| 2010/0071580 | A1 * | 3/2010 | Nakayasu | B60R 21/261 102/530 |
| 2010/0242779 | A1 * | 9/2010 | Katsuda | F42B 3/103 102/530 |
| 2013/0276663 | A1 * | 10/2013 | Ohsugi | B60R 21/2644 102/530 |
| 2015/0217717 | A1 * | 8/2015 | Ohsugi | B60R 21/2644 102/530 |
| 2017/0166160 | A1 * | 6/2017 | Izuma | B60R 21/264 |
| 2019/0061677 | A1 * | 2/2019 | Izuma | B01J 7/00 |

FOREIGN PATENT DOCUMENTS

| | | |
|---|---|---|
| JP | 2011-92853 A | 5/2011 |
| JP | 2011-092853 A | 5/2011 |
| JP | 4700844 B2 | 6/2011 |
| JP | 2014-046704 A | 3/2014 |

OTHER PUBLICATIONS

International Search Report for PCT/JP2017/001001 (PCT/ISA/210) dated Feb. 21, 2017.
Written Opinion of the International Searching Authority for PCT/JP2017/001001 (PCT/ISA/237) dated Feb. 21, 2017.

* cited by examiner

GAS GENERATOR

FIELD OF INVENTION

The present invention relates to a gas generator which is usable for various purposes which use gas, such as an airbag apparatus mounted in an automobile or the like.

DESCRIPTION OF RELATED ART

In JP-A No. 2014-46704, the invention of a gas generator for an airbag apparatus is disclosed.

Figure 1:
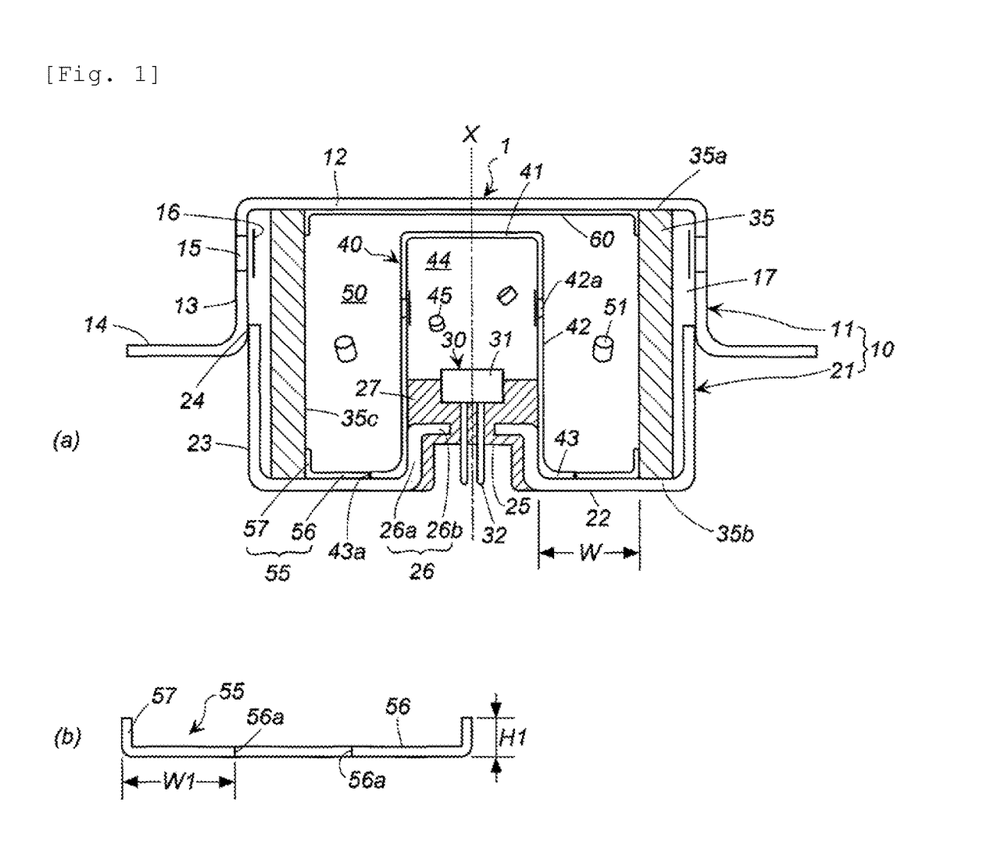

In a gas generator 1A shown in FIG. 1, a cup-shaped member 50 accommodating a transfer charge 56, and a first pad member 70 are disposed in a combustion chamber 60.

In FIG. 7, it is described that a second extension part 71 of the first pad member 70 is disposed on a tip part 54 of a first extension part 53 of the cup-shaped member 50, and the tip part 54 of the first extension part 53 is held between the second extension part 71 and a bottom plate part 11 in the axial direction of a housing (paragraph number 92).

In FIG. 8, it is described that a tip curved part 74 extends to a position in the vicinity of an axial end of a projecting cylindrical part 13 of the bottom plate part 11, and also in this section, the first extension part 53 of the cup-shaped member 50 is held between the bottom plate part 11 and the second extension part 71 in the axial direction of the housing (paragraph number 112).

SUMMARY OF INVENTION

A first embodiment of the present invention (hereinafter referred to as "the first embodiment") provides a gas generator, including a housing having a top plate, a bottom plate and a circumferential wall between the top plate and the bottom plate, a portion of the bottom plate having an opening, the bottom plate further having a cylindrical wall extending from the opening in a direction toward the top plate, and the circumferential wall being provided with gas discharge ports, in the housing, a cylindrical filter being disposed to be spaced apart from the gas discharge ports of the circumferential wall of the housing and having an upper end surface abutted against the top plate and a lower end surface abutted against the bottom plate, an ignition device chamber being formed inside a cup-shaped ignition device chamber housing fitted to the cylindrical wall of the bottom plate of the housing from the outside, and accommodating an ignition device including an igniter, a combustion chamber being located radially between the cylindrical filter and the cup-shaped ignition device chamber housing and being charged with a gas generating agent, the cup-shaped ignition device chamber housing having a flange at an opening thereof and being fitted to the cylindrical wall of the bottom place of the housing such that the flange is abutted against the bottom plate, an annular retainer being disposed between the cylindrical filter and the cup-shaped ignition device chamber housing, the annular retainer having an annular base portion and an annular wall extending from an outer circumferential edge of the annular base portion toward the top plate, and in the annular retainer, the annular wall being abutted against an inner circumferential surface of the cylindrical filter, the annular base portion being abutted against the bottom plate of the housing, and the annular base portion and the flange of the cup-shaped ignition device chamber housing not being overlapped in a thickness direction.

A second embodiment of the present invention (hereinafter referred to as "the second embodiment") provides a gas generator, including a housing having a top plate, a bottom plate and a circumferential wall between the top plate and the bottom plate, a portion of the bottom plate having an opening, the bottom plate further having a cylindrical wall extending from the opening in a direction toward the top plate, and the circumferential wall being provided with gas discharge ports, in the housing, a cylindrical filter being disposed to be spaced apart from the gas discharge ports of the circumferential wall of the housing and having an upper end surface abutted against the top plate and a lower end surface abutted against the bottom plate, an ignition device chamber being formed inside a cup-shaped ignition device chamber housing fitted to the cylindrical wall of the bottom plate of the housing from the outside, and accommodating an ignition device including an igniter, a combustion chamber being located radially between the cylindrical filter and the cup-shaped ignition device chamber housing and being charged with a gas generating agent, the cup-shaped ignition device chamber housing having a flange at an opening thereof and being fitted to the cylindrical wall of the bottom plate of the housing such that the flange is abutted against the bottom plate, an annular retainer being disposed between the cylindrical filter and the cup-shaped ignition device chamber housing, the annular retainer having an annular base portion and an annular wall extending from an outer circumferential edge of the annular base portion toward the top plate, and in the annular retainer, the annular wall being abutted against an inner circumferential surface of the cylindrical filter, and the annular base portion being abutted against the bottom plate of the housing, and the annular base portion and the flange of the cup-shaped ignition device chamber housing being overlapped such that the annular base portion is on the side of the bottom plate and the flange is on the side of the top plate.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows, in (a), a cross-sectional view of a gas generator of the present invention in an X -axis direction, and in (b), a cross-sectional view of an annular retainer shown in (a);

FIG. 3 shows, in (a), a partial cross-sectional view of a gas generator of another embodiment other than that shown in FIG. 1, and, in (b), a view showing a state of the gas generator in (a) during actuation;

DETAILED DESCRIPTION OF INVENTION

In the gas generator shown in FIGS. 7 and 8 of JP-A No. 2014-46704, when a pressure in the cup-shaped member 50 increases upon actuation, the cup-shaped member 50 is deformed or broken by the pressure. When a gas generating agent is subsequently burned, an outer shell housing is also likely to be deformed vertically in an axial direction.

In FIGS. 7 and 8, the tip part 54 of the cup-shaped member 50 is closer to the bottom plate part 11 than the second extension part 71 of the first pad number 70 is. When the tip part 54 is deformed by the pressure generated in the cup-shaped member 50 and the first pad member 70 is raised thereby, a gap is readily formed between a filter 90 and the second extension part 71.

When a combustion product passes through the formed gap, a short-passing of the combustion gas occurs, that is, the combustion gas is discharged without passing through the filter 90.

The present invention provides a gas generator in which the short-passing of the combustion gas does not occur even when a housing is deformed by a pressure generated by combustion of a gas generating agent upon actuation.

A housing has a top plate, a bottom plate, and a circumferential wall between the top plate and the bottom plate. The circumferential wall has a plurality of gas discharge ports.

The housing is made of a metal such as iron or stainless steel.

In the bottom plate of the housing, a portion thereof has an opening and a cylindrical wall is formed to extend from the opening in a direction toward the top plate. The opening preferably includes the center of the bottom plate, but may also be at a position deviated from the center.

A cylindrical wall having an annular surface protruding radially inward from an opening on the side of the top plate can be used.

As the housing, a combination of a diffuser shell and a closure shell can be used, the diffuser shell having a top plate, an upper circumferential wall and gas discharge ports in the upper circumferential wall, and a closure shell having a bottom plate, a lower circumferential wall and the cylindrical wall.

The housing is formed by fixing a contact portion of the upper circumferential wall and the lower circumferential wall with a known method such as welding.

An ignition device chamber housing is cup-shaped, and made of metal similarly to the housing. A circumferential surface of the ignition device chamber housing has a fragile portion to be ruptured upon actuation, a through hole closed with a seal tape or the like.

An ignition device in the ignition device chamber preferably includes an igniter, and a known transfer charge or a gas generating agent functioning as a transfer charge.

The igniter is preferably fixed to the cylindrical wall via a resin.

The cup-shaped ignition device chamber housing has a bottom surface and the circumferential surface, and an end portion thereof opposite to the bottom surface has an opening. A flange extending radially outward is provided at the opening.

The ignition device chamber housing is fitted to the cylindrical wall of the bottom plate of the housing from the outside, such that the flange is abutted against the bottom plate of the housing.

The ignition device chamber housing may move in an axial direction upon actuation, but it is necessary to prevent the ignition device chamber housing from being detached from the cylindrical wall. As an insertion method, a press-fitting method or the like can be used, but welding is not used.

The bottom surface of the ignition device chamber housing may be abutted against the top plate of the housing or may be spaced apart from the top plate. When the bottom surface of the ignition device chamber housing is spaced apart from the top plate, a distance therebetween is set at least to be smaller than a length of the cylindrical wall of the bottom plate of the housing.

A shape of a boundary portion of the opening and the flange of the ignition device chamber housing is preferably corresponding to a boundary portion of the bottom plate and the cylindrical wall of the housing, so that they are fitted to each other without a gap.

A gas generating agent in the combustion chamber is known and in a predetermined shape such as a column or a disk.

An annular retainer has an annular base portion and an annular wall extending from an outer circumferential edge of the annular base portion toward the top plate.

In the annular retainer, the annular wall is abutted against an inner circumferential surface of the cylindrical filter, and the annular base portion is abutted against the bottom plate of the housing.

A boundary portion of the annular wall and the annular base portion faces a contact portion of a lower end surface of the cylindrical filter and the bottom plate of the housing.

An inner circumferential edge of the annular base portion and an outer circumferential edge of the flange are not in contact with each other, or the annular base portion of the annular retainer and the flange of the ignition device chamber housing may be in contact with each other at least in part, but they are not overlapped in a thickness direction.

When the gas generator is actuated, a pressure in the ignition device chamber increases first, so that the ignition device housing moves toward the top plate. Then, the internal pressure is raised due to combustion of the gas generating agent in the combustion chamber, the top plate and the bottom plate of the housing are deformed outward in the opposite directions. At this time, the bottom plate is deformed downward.

Accordingly, when the flange of the ignition device chamber housing is located under the annular base portion of the annular retainer (on the side of the bottom plate) the annular base portion is raised by the flange during actuation of the ignition device. Further, when the bottom plate is deformed, a gap is formed between the annular retainer and the boundary portion of the bottom plate of the housing and the lower end surface of the cylindrical filter, which can cause the short-passing of the combustion gas.

In the gas generator of the present invention, the annular base portion of the annular retainer and the flange of the ignition device chamber housing are not overlapped in a thickness direction. Accordingly, even when the deformation described above occurs, the flange does not raise the annular base portion, and such a state is maintained that the annular retainer is abutted against the boundary portion of the bottom plate of the housing and the lower end surface of the cylindrical filter.

As a result, the combustion gas is discharged from the gas discharge ports via the cylindrical filter, and the short-passing, that is, discharge of the combustion gas without passing through the cylindrical filter, does not occur.

A length of the cylindrical wall is set equal to or larger than a distance over which the bottom surface of the cup-shaped ignition device chamber housing moves to abut against the top plate. This realizes a structure in which the ignition device chamber housing is not completely detached from the cylindrical wall even when the ignition device chamber housing moves toward the top plate in the event of the pressure increase in the ignition device chamber due to actuation. Further, the flange functions as a pressure receiving surface which receives the pressure in the combustion chamber and functions to push down the cup-shaped ignition device chamber housing toward the bottom plate. Therefore, the flange has a portion extending in a direction along the bottom plate of the housing (in a radial direction relative to the center axis of the housing). A length of this portion can be set to ⅓ to ⅘ of a distance between the inner circumferential surface of the cylindrical filter and the circumferential surface of the cup-shaped ignition device chamber housing.

It is preferable in the gas generator of the first embodiment that the bottom plate of the housing between the inner circumferential surface of the cylindrical filter and the cylindrical wall has an annular recess provided closer to the inner circumferential surface of the cylindrical filter and an annular projection provided closer to the cylindrical wall, which is formed of a level difference from the annular recess, and the annular base portion and a boundary portion of the annular wall and the annular base portion of the annular retainer are fitted into the annular recess, the flange of the cup-shaped ignition device chamber housing is abutted on the annular projection, and thereby, the annular base portion and the flange of the cup-shaped ignition device chamber housing are not overlapped in a thickness direction.

Since the annular base portion and the flange of the ignition device chamber housing are positioned at the annular recess and the annular projection with different heights respectively, the inner circumferential edge of the annular base portion and the flange of the ignition device chamber housing are not overlapped in the thickness direction.

It is preferable in the gas generator of the first embodiment that the bottom plate of the housing has an annular projection located radially inside the cylindrical filter, in the annular retainer, the annular wall is abutted against the inner circumferential surface of the cylindrical filter, the annular base portion is abutted against the bottom plate of the housing, and the inner circumferential edge of the annular base portion is abutted against the annular projection, and the flange of the cup-shaped ignition device chamber housing is located radially inside the annular projection, and thereby, the annular base portion and the flange of the cup-shaped ignition device chamber housing are not overlapped in a thickness direction.

Because of the annular projection of the bottom plate of the housing, the inner circumferential edge of the annular base portion and the flange of the ignition device chamber housing are not overlapped in the thickness direction.

It is preferable in the gas generator of the first embodiment that in the annular retainer, a length W1 of the annular base portion and a height H1 of the annular wall satisfy a relationship of W1>H1, and a length W from an outer circumferential surface of the cylindrical wall of the bottom plate of the housing to the inner circumferential surface of the cylindrical filter and the length W1 satisfy a relationship of W1/W=0.1 to 0.7.

With the use of the annular retainer having such a shape and a size ratio, even when the bottom plate is deformed by receiving the pressure during actuation, the annular base portion receives the pressure similarly and is easily deformed along with the deformation of the bottom plate, and thereby a state is maintained such that the annular retainer is abutted against the boundary portion of the bottom plate of the housing and the lower end surface of the cylindrical filter.

As a result, the combustion gas is discharged from the gas discharge ports via the cylindrical filter, and the short-passing, that is, discharge of the combustion gas without passing through the cylindrical filter, does not occur.

It is preferable in the gas generator of the first embodiment that an annular plate is disposed at a position such as to cover an annular boundary portion between the annular base portion of the annular retainer and the flange of the ignition device chamber housing, and an outer circumferential portion of the annular plate is abutted against the annular wall of the annular retainer, or an inner circumferential portion of the annular plate is abutted against a boundary portion of the circumferential wall surface and the flange of the ignition device chamber housing.

With the use of such an annular plate, when a gap is formed in the annular boundary portion of the inner circumferential edge of the annular base portion and the flange of the ignition device chamber housing, the annular plate covers the gap (the annular gap) and prevents entrance of the gas generating agent (maintaining the bottom surface of the combustion chamber flat). Further, the annular plate performs a fixing function by pressing the annular base portion of the annular retainer and the flange of the ignition device housing before actuation.

The gas generator of the second embodiment is different from the gas generator of the first embodiment in that the annular base portion and the flange of the cup-shaped ignition device chamber housing are overlapped such that the annular base portion is on the side of the bottom plate and the flange is on the side of the top plate.

Accordingly, even when the bottom plate is deformed downward upon actuation, such a situation does not occur that the annular base portion is raised by the flange, and no short-passing occurs. Also in the gas generator of the second embodiment, in the same manner as in the gas generator of the first embodiment, the length of the cylindrical wall can be set equal to or larger than the distance over which the bottom surface of the cup-shaped ignition device chamber housing moves to abut against the top plate. Further, the flange functions as the pressure receiving surface which receives the pressure in the combustion chamber and functions to push down the cup-shaped ignition device chamber housing toward the bottom plate. Therefore, the flange has a portion extending in a direction along the bottom plate of the housing (in a radial direction relative to the center axis of the housing). The length of this portion can be set to ⅓ to ⅘ of the distance between the inner circumferential surface of the cylindrical filter and the circumferential surface of the cup-shaped ignition device chamber housing.

It is preferable in the gas generator of the second embodiment that in the annular retainer, a length W1 of the annular base portion and a height H1 of the annular wall satisfy a relationship of W1>H1, and a length W from an outer circumferential surface of the cylindrical wall of the bottom plate of the housing to the inner circumferential surface of the cylindrical filter and the length W1 satisfy a relationship of W1/W=0.1 to 0.7.

With the use of the annular retainer having such a shape and a size ratio, even when the bottom plate is deformed by receiving the pressure during actuation, the annular base portion receives the pressure similarly and is easily deformed along with the deformation of the bottom plate, and thereby a state is maintained such that the annular retainer is abutted against the boundary portion of the bottom plate of the housing and the lower end surface of the cylindrical filter.

As a result, the combustion gas is discharged from the gas discharge ports via the cylindrical filter, and the short-passing, that is, discharge of the combustion gas without passing through the cylindrical filter, does not occur.

The gas generator of the present invention is usable as a gas generator used in an airbag apparatus for an automobile, and for various purposes which require an instantaneous supply of gas.

In the gas generator of the present invention, the short-passing of the combustion gas between the lower end surface of the cylindrical filter and the bottom plate of the housing during actuation is prevented.

Description of Embodiments (1) Gas Generator Shown in FIG. 1

A gas generator 1 has a housing 10 serving as an outer shell container.

The housing 10 is formed of a combination of a diffuser shell 11, which includes a top plate 12 and an upper circumferential wall 13 vertically extending in one direction from the top plate 12 and a flange 14 at an opening, and a closure shell 21 which includes a bottom plate 22 and a lower circumferential wall 23 vertically extending in one direction from the bottom plate 22.

The diffuser shell 11 and the closure shell 21 are integrated by welding at a contact area 24 between an inner circumferential surface of the upper circumferential wall 13 of the diffuser shell 11 on the side of the opening and an outer circumferential surface of the lower circumferential wall 23 of the closure shell 21.

The diffuser shell 11 has a plurality of gas discharge ports 15 formed in the upper circumferential wall 13 at equal intervals in a circumferential direction.

The plurality of the gas discharge ports 15 are closed from the inside with an adhesive tape 16 made of aluminum or the like.

The bottom plate 22 of the closure shell 21 has an opening formed in the center portion thereof and a cylindrical wall 26 extending from an opening 25 in a direction toward the top plate 12.

The cylindrical wall 26 includes a cylindrical portion 26a extending from the opening 25 in a direction toward the top plate 12 and an annular surface 26b extending radially inward from the cylindrical portion 26a.

An igniter 30 is attached to the cylindrical wall 26 via a resin portion 27. The igniter 30 has an ignition portion 31 and a conductive pin 32.

An outer diameter of the cylindrical wall 26 is the same as an outer diameter of the resin portion 27. The cylindrical wall 26 and the resin portion 27 form a single column as a whole.

In the housing 10, a cylindrical filter 35 is disposed to be spaced from the gas discharge ports 15 of the upper circumferential wall 13, thereby obtaining a space 17 therebetween.

An upper end surface 35a of the cylindrical filter 35 abuts against the top plate 12, and a lower end surface 35b thereof abuts against the bottom plate 22.

A cup-shaped ignition device chamber housing 40 is fitted to the cylindrical wall 26 and the resin portion 27 from the outside. The ignition device chamber housing 40 is press-fitted to the cylindrical wall 26 (the cylindrical portion 26a). The resin portion 27 can be protruded slightly out of the cylindrical portion 26a so that the ignition device chamber housing is fitted to the protruded resin portion.

The ignition device chamber housing 40 is cup-shaped and has a bottom surface 41, a circumferential surface (an ignition device chamber circumferential surface) 42, and a flange 43 at an opening.

Through holes 42a are formed at equal intervals in the circumferential direction in the circumferential surface 42. The through holes 42a are preferably closed with a seal tape made of aluminum or the like.

The ignition device chamber housing 40 may have the structure in which an opening of the bottom surface 41 thereof is closed by a lid that is a separate member from the circumferential surface 42.

A space inside the ignition device chamber housing 40 is an ignition device chamber 44, and a first gas generating agent 45 which serves as a transfer charge is charged therein.

The flange 43 (inclusive of the boundary portion of the circumferential surface 42 and the flange 43) is abutted against both of the cylindrical wall 26 (the cylindrical portion 26a) and the bottom plate 22. The flange 43 extends in a direction (a radial direction) along the bottom plate of the housing 22. A length of the flange 43 in the radial direction is set to ⅓ to ⅘ of a distance between an inner circumferential surface 35c of the cylindrical filter 35 and the circumferential surface 42 of the cup-shaped ignition device chamber housing 40, and this length in FIG. 1 is ⅓.

A space located radially between the cylindrical filter 35 and the ignition device chamber housing 40 is a combustion chamber 50, and a known second gas generating agent 51 is charged therein.

Further, an annular retainer 55 is disposed between the cylindrical filter 35 and the ignition device chamber housing 40.

The annular retainer 55 has an annular base portion 56 and an annular wall 57 extending from an outer circumferential edge of the annular base portion 56 toward the top plate 12.

In the annular retainer 55, a width W1 of the annular base portion 56 (a distance from an inner circumferential edge 56a of the annular base portion 56 to the outer circumferential surface of the annular wall 57) and a height H1 of the annular wall 57 (a distance from the upper end portion of the annular wall 57 to the lower surface of the annular base portion 56), which are shown (b) in FIG. 1, satisfy a relationship of W1>H1.

Preferably, a width W from the outer circumferential surface of the cylindrical wall 26 (the cylindrical portion 26a) of the bottom plate 22 to the inner circumferential surface 35c of the cylindrical filter 35 and the width W1 satisfy a relationship of W1/W=0.1 to 0.7. A height of the cylindrical portion 26a in an X-axis direction is sufficiently larger than a distance between the bottom surface 41 of the cup-shaped ignition device chamber housing 40 and a retainer 60 (or the top plate 12 of the housing in the case that the retainer 60 is not arranged). The distance may be set such that the gas generating agent 51 is prevented from entering between the bottom surface 41 of the cup-shaped ignition device chamber housing 40 and the retainer 60 (or the top plate 12 of the housing in the case that the retainer 60 is not arranged).

The annular wall 57 of the annular retainer 55 is abutted against the inner circumferential surface 35c of the cylindrical filter 35, and the annular base portion 56 thereof is abutted against the bottom plate 22 of the housing. The inner circumferential edge 56a of the annular base portion 56 and a circumferential edge tip portion (an outer circumferential edge of the flange) 43a of the flange 43 of the ignition device chamber housing 40 are not overlapped in a thickness direction. Preferably, a gap is obtained between the inner circumferential edge 56a of the annular base portion 56 and the circumferential edge tip portion 43a of the flange 43 of the ignition device chamber housing 40.

The annular retainer 55 is arranged to prevent a short-passing of a combustion gas between the bottom plate 22 of the housing and the lower end surface 35b of the cylindrical filter.

Note that, in order to prevent a short-passing of a combustion gas between the top plate 12 of the housing and the upper end surface 35a of the cylindrical filter, the retainer 60 may be arranged on the side of the top plate 12.

An operation of the gas generator 1 shown in FIG. 1 will be described hereinbelow.

When the igniter 30 is actuated, the first gas generating agent 45 in the ignition device chamber 44 is ignited and burned to generate a combustion gas.

The combustion gas in the ignition device chamber 44 is released from the plurality of the through holes 42a into the combustion chamber 50, and the second gas generating agent 51 is ignited and burnt to generate a combustion gas.

The combustion gas in the combustion chamber 50 enters the space 17 through the cylindrical filter 35 and then ruptures the seal tape 16 to be discharged from the gas discharge ports 15.

In the process of the operation described above, a pressure in the ignition device chamber 44 increases first. The ignition device chamber housing 40 is fitted to the cylindrical wall 26 but not fixed by welding. Therefore, the ignition device chamber housing 40 is likely to slide in a direction toward the top plate 12. Further, when a combustion product flows from the through holes 42a into the combustion chamber 50 to burn the gas generating agent 51 and increase a pressure in the combustion chamber 50, the top plate 12 and the bottom plate 22 are deformed in opposite directions along an X-axis.

Figure 2:
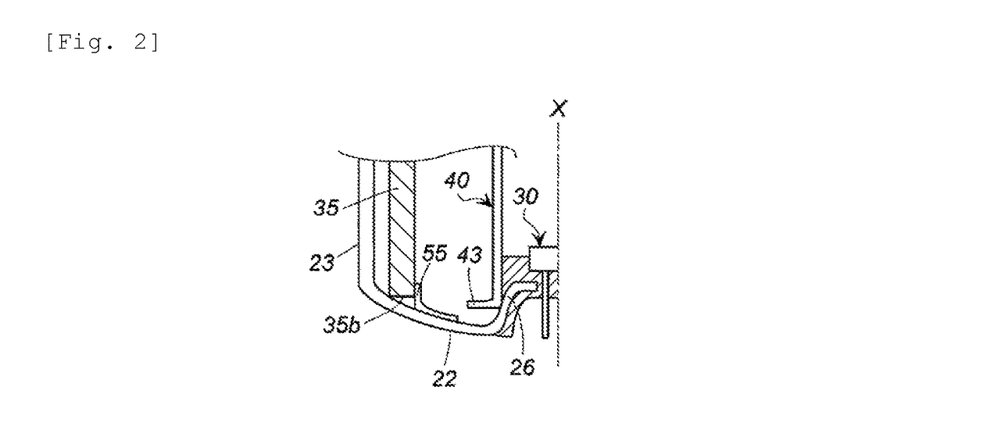
FIG. 2 shows a partial cross-sectional view showing a state of the gas generator shown in FIG. 1 during actuation.

At this time, as shown in FIG. 2, the ignition device chamber housing 40 also moves in a direction toward the top plate 12. However, the length of the cylindrical wall 26 is set to be larger than the moving distance of the ignition device chamber housing 40, and thereby, the ignition device chamber housing 40 is not detached from the cylindrical wall 26.

In the case where the annular retainer 55 (the annular base portion 56) is overlapped with the flange 43 prior to actuation, the annular base portion 56 is raised by the flange 43 in the deformation state shown in FIG. 2. Consequently, the short-passing of the combustion gas is likely to occur between the bottom plate 22 of the housing and the lower end surface 35b of the cylindrical filter.

However, in the gas generator 1 shown in FIG. 1, the annular base portion 56 and the flange 43 are not overlapped in the thickness direction, and thereby, the state shown in FIG. 2 is realized. Accordingly, it is possible to prevent the short-passing of the combustion gas between the bottom plate 22 of the housing and the lower end surface 35b of the cylindrical filter. Further, since the pressure generated in the combustion chamber acts also on the bottom surface 41 of the ignition device chamber housing, the flange 43 serves as a pressure receiving surface for the pressure generated in the combustion chamber. In particular, the flange 43 has an area sufficient to serve as the pressure receiving surface, and such a mechanism operates that the pressure generated in the combustion chamber 50 acts on the flange 43 to push back the ignition device chamber housing 40 in a direction toward the bottom plate 22. As a result, it is possible to relatively inhibit a displacement of the ignition device chamber housing 40.

When the annular retainer 55 satisfies the relationship of W1>H1 mentioned above and further satisfies the relationship of W1/W=0.1 to 0.7, in the event of the pressure increase in the combustion chamber 50, the annular base portion 56 is easily pressed against the bottom plate 22. Thereby, the annular base portion 56 is easily deformed along with deformation of the bottom plate 22.

As a result, an advantageous effect of preventing the short-passing described above is preferably enhanced.

Figure 3:
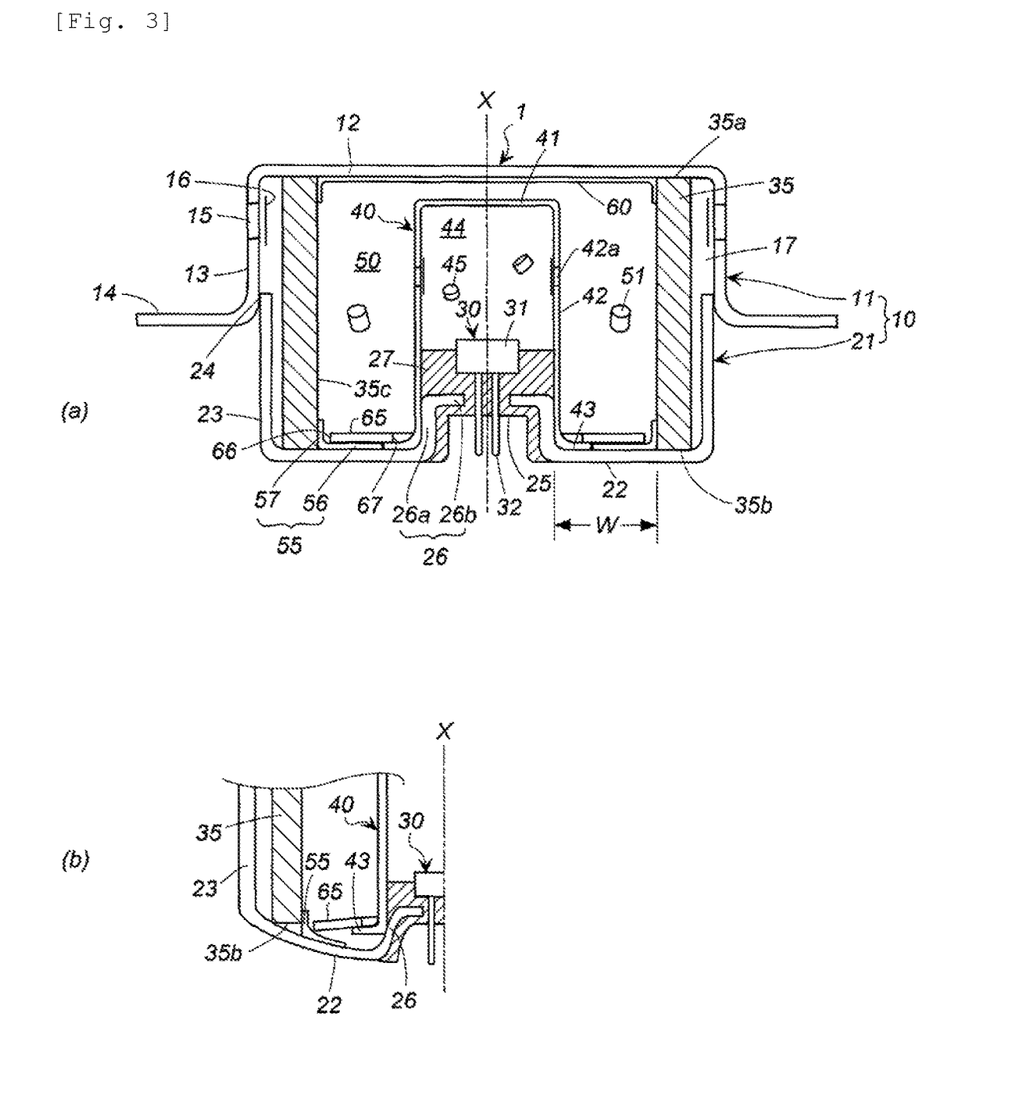

(2) Gas Generator Shown in FIG. 3

The gas generator 1 shown in (a) in FIG. 3 is the gas generator 1 shown in (a) in FIG. 1 with an annular plate 65, and the members other than the annular plate 65 are the same as those of the gas generator 1 shown, in (a) in FIG. 1.

The annular plate 65 is disposed at a position such as to cover an annular boundary portion of the annular base portion 56 of the annular retainer 55 and the flange 43 of the ignition device chamber housing 40.

The annular plate 65 is abutted against both of the annular base portion 56 and the flange 43.

An outer circumferential portion 66 of the annular plate 65 is abutted against the annular wall 57 of the annular retainer 55 or the outer circumferential portion 66 is located at a position proximate thereto.

The annular plate 65 functions to fix the annular base portion 56 during assembly and also functions to maintain the surface of the combustion chamber 50 on the side of the bottom plate 22 flat after assembly.

Upon actuation, the gas generator 1 shown in FIG. 3 operates similarly to the gas generator 1 shown in (a) in FIG. 1. In the state shown in (b) in FIG. 3 corresponding to FIG. 2, the annular plate 65 is deformed upon receiving the pressure increase in the combustion chamber 50 so as to press the annular retainer 55, which enhances an advantageous effect of preventing the short-passing.

Figure 4:
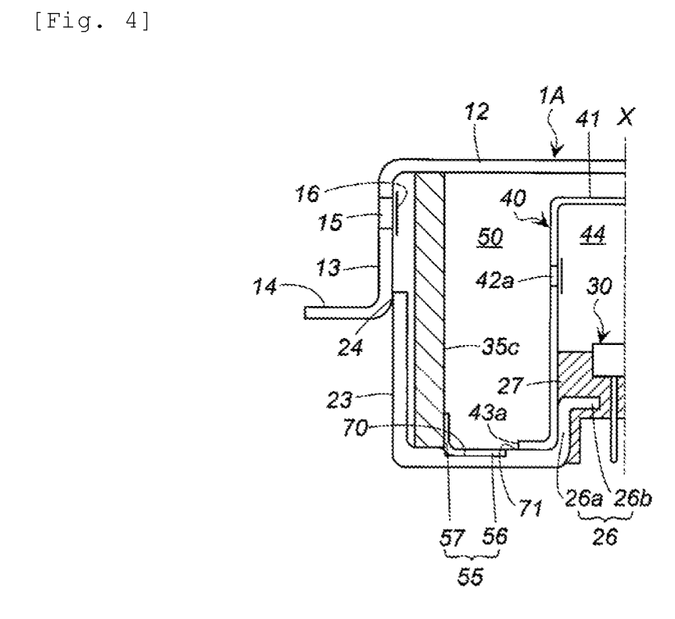
FIG. 4 shows a partial cross-sectional view of a gas generator of still another embodiment other than that shown in FIG. 1.

(3) Gas Generator Shown in FIG. 4

A gas generator 1A shown in FIG. 4 is different from the gas generator 1 shown in (a) in FIG. 1 only in part. The following will describe the part different from the gas generator 1 shown in (a) in FIG. 1.

Between the inner circumferential surface 35c of the cylindrical filter 35 and the cylindrical wall 26 (the cylindrical portion 26a), the bottom plate 22 of the housing has an annular recess 70 on the side of the inner circumferential surface 35c of the cylindrical filter 35 and has an annular projection 71 on the side of the cylindrical wall 26 (the cylindrical portion 26a) which is obtained by a level difference from the annular recess 70.

The annular recess 70 and the annular projection 71 are formed by varying a thickness of the bottom plate 22. The annular recess 70 is preferably formed by reducing an original thickness of the bottom plate 22.

A dimension of the level difference between the annular recess 70 and the annular projection 71 may appropriately be equivalent to a thickness of the annular base portion 56.

The annular base portion 56 and the boundary portion of the annular wall 57 and the annular base portion 56 in the annular retainer 55 are fitted in the annular recess 70.

The flange 43 of the ignition device chamber housing 40 is abutted on the annular projection 71. A width of the flange 43 is not more than a width of the annular projection 71.

Since the gas generator 1A shown in (a) in FIG. 4 has the annular recess 70 and the annular projection 71, the inner circumferential edge 56a of the annular base portion 56 and the circumferential edge tip portion 43a of the flange 43 are not overlapped in a thickness direction.

Thereby, the gas generator 1A operates similarly to the gas generator 1 shown in (a) in FIG. 1.

Figure 5:
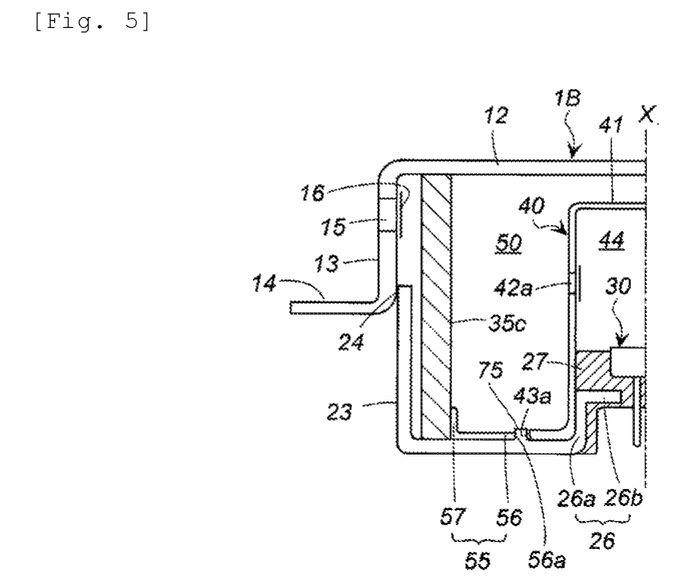
FIG. 5 shows a partial cross-sectional view of a gas generator of still another embodiment other than those shown in FIGS. 1, 3, and 4.

(4) Gas Generator Shown in FIG. 5

A gas generator 1B shown in FIG. 5 is different from the gas generator 1 shown in (a) in FIG. 1 only in part. The following will describe the part different from the gas generator 1 shown in (a) in FIG. 1.

The bottom plate 22 has an annular projection 75 located radially inside the cylindrical filter 35.

In the annular retainer 55, the annular wall 57 is abutted against the inner circumferential surface 35c of the cylindrical filter 35, the annular base portion 56 is abutted against the bottom plate 22 of the housing, and the inner circumferential edge 56a of the annular base portion 56 is abutted against the annular projection 75.

The flange 43 of the ignition device chamber housing 40 is located radially inside the annular projection 75. The circumferential edge tip portion 43a of the flange 43 is abutted against the annular projection 75.

A height of the annular projection 75 from the bottom plate 22 is equivalent to thicknesses of the annular base portion 56 and the flange 43.

Since the gas generator 1B shown in FIG. 5 has the annular projection 75, the inner circumferential edge 56a of the annular base portion 56 and the circumferential edge tip portion 43a of the flange 43 are not overlapped in a thickness direction.

Thereby, the gas generator 1B operates similarly to the gas generator 1 shown in (a) in FIG. 1.

Figure 6:
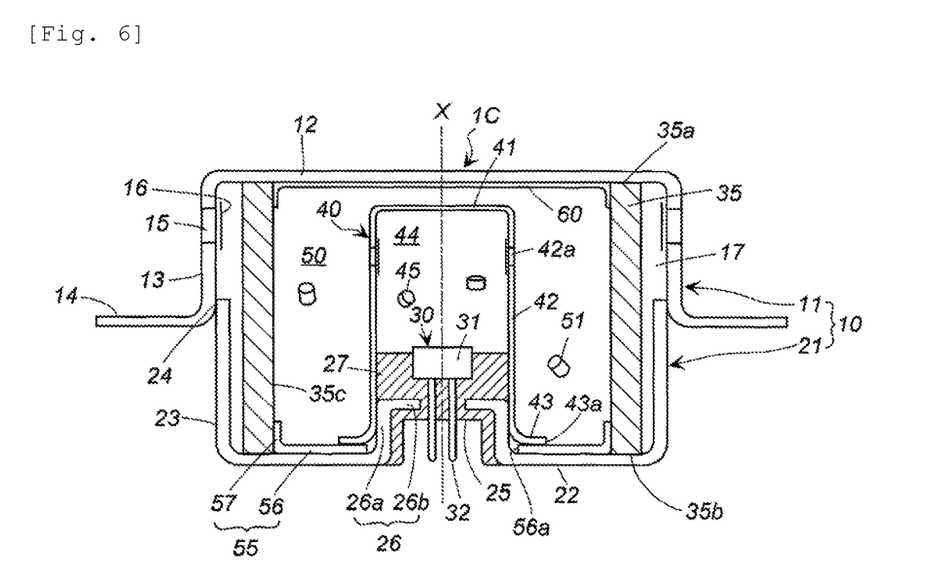
FIG. 6 shows a cross-sectional view of a gas generator of still another embodiment other than those shown in FIGS. 1, 3, 4, and 5 in the X-axis direction.

(5) Gas Generator Shown in FIG. 6

A gas generator 1C shown in FIG. 6 is different from the gas generator 1 shown in (a) in FIG. 1 only in part. The following will describe the part different from the gas generator 1 shown in (a) in FIG. 1.

The flange 43 is abutted against the cylindrical wall 26 (the cylindrical portion 26a).

In the annular retainer 55, the annular wall 57 is abutted against the inner circumferential surface 35c of the cylindrical filter 35 and the annular base portion 56 is abutted against the bottom plate 22.

Unlike in (a) in FIG. 1, a width of one or both of the flange 43 and the annular base portion 56 is adjusted so as to allow the annular base portion 56 (the inner circumferential edge 56a) and the flange 43 (the circumferential edge tip portion 43a) to be overlapped, with the annular base portion 56 on the side of the bottom plate 22 and the flange 43 on the side of the top plate 12.

A length of the overlapping portions of the flange 43 and the annular base portion 56 described above is not particularly limited as long as the above vertical positions of the flange 43 and the annular base portion are maintained.

When the gas generator 1C shown in FIG. 6 operates similarly to the gas generator 1 shown in (a) in FIG. 1 and is in the deformation state shown in FIG. 2, the annular base portion 56 is not raised by the flange 43. Consequently, the short-passing of the combustion gas is prevented from occurring between the bottom plate 22 of the housing and the lower end surface 35b of the cylindrical filter.

When the annular retainer 55 satisfies the relationship of W1>H1 mentioned above and further satisfies the relationship of W1/W=0.1 to 0.7, in the event of the pressure increase in the combustion chamber 50, the annular base portion 56 is easily pressed against the bottom plate 22. Thereby, the annular base portion 56 is easily deformed along with deformation of the bottom plate 22.

As a result, an advantageous effect of preventing the short-passing described above is preferably enhanced.

Also in the embodiment shown in FIG. 6, the flange 43 of the ignition device chamber housing 40 extends in a direction (a radial direction) along the bottom plate 22 of the housing (the annular base portion 56 in FIG. 6). The length of the flange 43 in the radial direction is set to ⅓ to ⅘ of a distance between the inner circumferential surface 35c of the cylindrical filter 35 and the circumferential surface 42 of the cup-shaped ignition device chamber housing 40, and this length in FIG. 3 is ⅓. The pressure generated in the combustion chamber acts on the flange 43 serving as the pressure receiving surface to push down the ignition device chamber housing 40 in a direction toward the bottom plate 22.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising
a housing having a top plate, a bottom plate and a circumferential wall between the top plate and the bottom plate, a portion of the bottom plate having an opening, the bottom plate further having a cylindrical wall extending from the opening in a direction toward the top plate, and the circumferential wall being provided with gas discharge ports,
in the housing,
a cylindrical filter being disposed to be spaced apart from the gas discharge ports of the circumferential wall of the housing and having an upper end surface abutted against the top plate and a lower end surface abutted against the bottom plate,
an ignition device chamber being formed inside a cup-shaped ignition device chamber housing fitted to the cylindrical wall of the bottom plate of the housing from the outside, and accommodating an ignition device including an igniter,
a combustion chamber being located radially between the cylindrical filter and the cup-shaped ignition device chamber housing and being charged with a gas generating agent,
the cup-shaped ignition device chamber housing having a flange at an opening thereof, being fitted to the cylindrical wall of the bottom plate of the housing such that the flange is abutted against the bottom plate, and being slidable in a direction toward the top plate,
an annular retainer being disposed between the cylindrical filter and the cup-shaped ignition device chamber housing,
the annular retainer having an annular base portion and an annular wall extending from an outer circumferential edge of the annular base portion toward the top plate, and in the annular retainer, the annular wall being abutted against an inner circumferential surface of the cylindrical filter, the annular base portion being abutted against the bottom plate of the housing, and the annular base portion and the flange of the cup-shaped ignition device chamber housing not being overlapped in a thickness direction.

2. The gas generator according to claim 1, wherein an annular plate is disposed at a position such as to cover an annular boundary portion between the annular base portion of the annular retainer and the flange of the ignition device chamber housing.

3. The gas generator according to claim 1, wherein the bottom plate of the housing between the inner circumferential surface of the cylindrical filter and the cylindrical wall has an annular recess provided closer to the inner circumferential surface of the cylindrical filter and an annular projection closer to the cylindrical wall, which is formed of a level difference from the annular recess, and the annular base portion and a boundary portion of the annular wall and the annular base portion of the annular retainer are fitted into the annular recess, the flange of the cup-shaped ignition device chamber housing is abutted on the annular projection, and thereby, the annular base portion and the flange of the cup-shaped ignition device chamber housing are not overlapped in a thickness direction.

4. The gas generator according to claim 1, wherein the bottom plate of the housing has an annular projection located radially inside the cylindrical filter, in the annular retainer, the annular wall is abutted against the inner circumferential surface of the cylindrical filter, the annular base portion is abutted against the bottom plate of the housing, and the inner circumferential edge of the annular base portion is abutted against the annular projection, and the flange of the cup-shaped ignition device chamber housing is located radially inside the annular projection, and thereby, the annular base portion and the flange of the cup-shaped ignition device chamber housing are not overlapped in a thickness direction.

5. The gas generator according to claim 1, wherein, in the annular retainer, a length W1 of the annular base portion and a height H1 of the annular wall satisfy a relationship of W1>H1, and a length W from an outer circumferential surface of the cylindrical wall of the bottom plate of the housing to the inner circumferential surface of the cylindrical filter and the length W1 satisfy a relationship of W1/W=0.1 to 0.7.

6. A gas generator comprising a housing having a top plate, a bottom plate and a circumferential wall between the top plate and the bottom plate, a portion of the bottom plate having an opening, the bottom plate further having a cylindrical wall extending from the opening in a direction toward the top plate, and the circumferential wall being provided with gas discharge ports, in the housing,
a cylindrical filter being disposed to be spaced apart from the gas discharge ports of the circumferential wall of the housing and having an upper end surface abutted against the top plate and a lower end surface abutted against the bottom plate, an ignition device chamber being formed inside a cup-shaped ignition device chamber housing fitted to the cylindrical wall of the bottom plate of the housing from the outside, and accommodating an ignition device including an igniter, a combustion chamber being located radially between the cylindrical filter and the cup-shaped ignition device chamber housing and being charged with a gas generating agent, the cup-shaped ignition device chamber housing having a flange at an opening thereof and being fitted to the cylindrical wall of the bottom plate of the housing such that the flange is abutted against the bottom plate, an annular retainer being disposed between the cylindrical filter and the cup-shaped ignition device chamber housing, the annular retainer having an annular base portion and an annular wall extending from an outer circumferential edge of the annular base portion toward the top plate, and in the annular retainer, the annular wall being abutted against an inner circumferential surface of the cylindrical filter, and the annular base portion being abutted against the bottom plate of the housing, and the annular base portion and the flange of the cup-shaped ignition device chamber housing being overlapped such that the annular base portion is on the side of the bottom plate and the flange is on the side of the top plate.

7. The gas generator according to claim 6, wherein, in the annular retainer, a length W1 of the annular base portion and a height H1 of the annular wall satisfy a relationship of W1>H1, and a length W from an outer circumferential surface of the cylindrical wall of the bottom plate of the housing to the inner circumferential surface of the cylindrical filter and the length W1 satisfy a relationship of W1/W=0.1 to 0.7.

8. The gas generator according to claim 1, wherein a length of the flange in the radial direction is set to ⅓ to ⅘ of a distance between an inner circumferential surface of the cylindrical filter and a circumferential surface of the cup-shaped ignition device chamber housing.

9. The gas generator according to claim 1, wherein the cup-shaped ignition device chamber housing has a through hole formed in the circumferential surface thereof and is fitted to a cylindrical portion of the bottom plate extending in direction toward the top plate, and a height of the cylindrical portion in the X-axis direction is larger than a distance between a bottom surface of the cup-shaped ignition device chamber housing and the top plate.

10. The gas generator according to claim 1, wherein a gap is obtained between an inner circumferential edge of the annular base portion and a circumferential edge tip portion of the flange of the cup-shaped ignition device chamber housing.

* * * * *